United States Patent

[11] 3,617,857

[72] Inventor Philip D. Gunderson
 Prospect Heights, Ill.
[21] Appl. No. 040,589
[22] Filed May 26, 1970
[45] Patented Nov. 2, 1971
[73] Assignee Motorola, Inc.
 Franklin Park, Ill.

[54] VOLTAGE REGULATOR FOR BRUSHLESS ALTERNATOR
 5 Claims, 3 Drawing Figs.
[52] U.S. Cl............................................. 322/28,
 321/2, 321/45 R, 322/73
[51] Int. Cl............................................. H02p 9/30
[50] Field of Search........................................... 322/28, 59,
 73, 75; 321/2, 18, 49

[56] References Cited
 UNITED STATES PATENTS
 3,522,520 8/1970 Goldman...................... 322/28
 3,214,599 10/1965 Wellford...................... 322/28 X
 3,401,328 9/1968 Hartung........................ 322/28
 3,539,905 11/1970 Schwarz....................... 321/2 X
 3,526,823 9/1970 Genuit.......................... 321/2

Primary Examiner—T. E. Lynch
Assistant Examiner—H. Huberfeld
Attorney—Mueller and Aichele ABSTRACT: A voltage regulator for brushless alternators including an oscillator circuit which has the output thereof fed into a stationary, primary winding of a rotary transformer device which, in turn, has a secondary winding thereof rotatable with the rotor shaft of the alternator. The oscillator is a free running oscillator at substantially a fixed frequency and the output of the alternator is fed back to a voltage sensor circuit which, in turn controls the oscillator between fully on and fully off conditions to regulate the output therefrom to the primary winding of the rotary transformer thereby regulating the power output of the alternator.

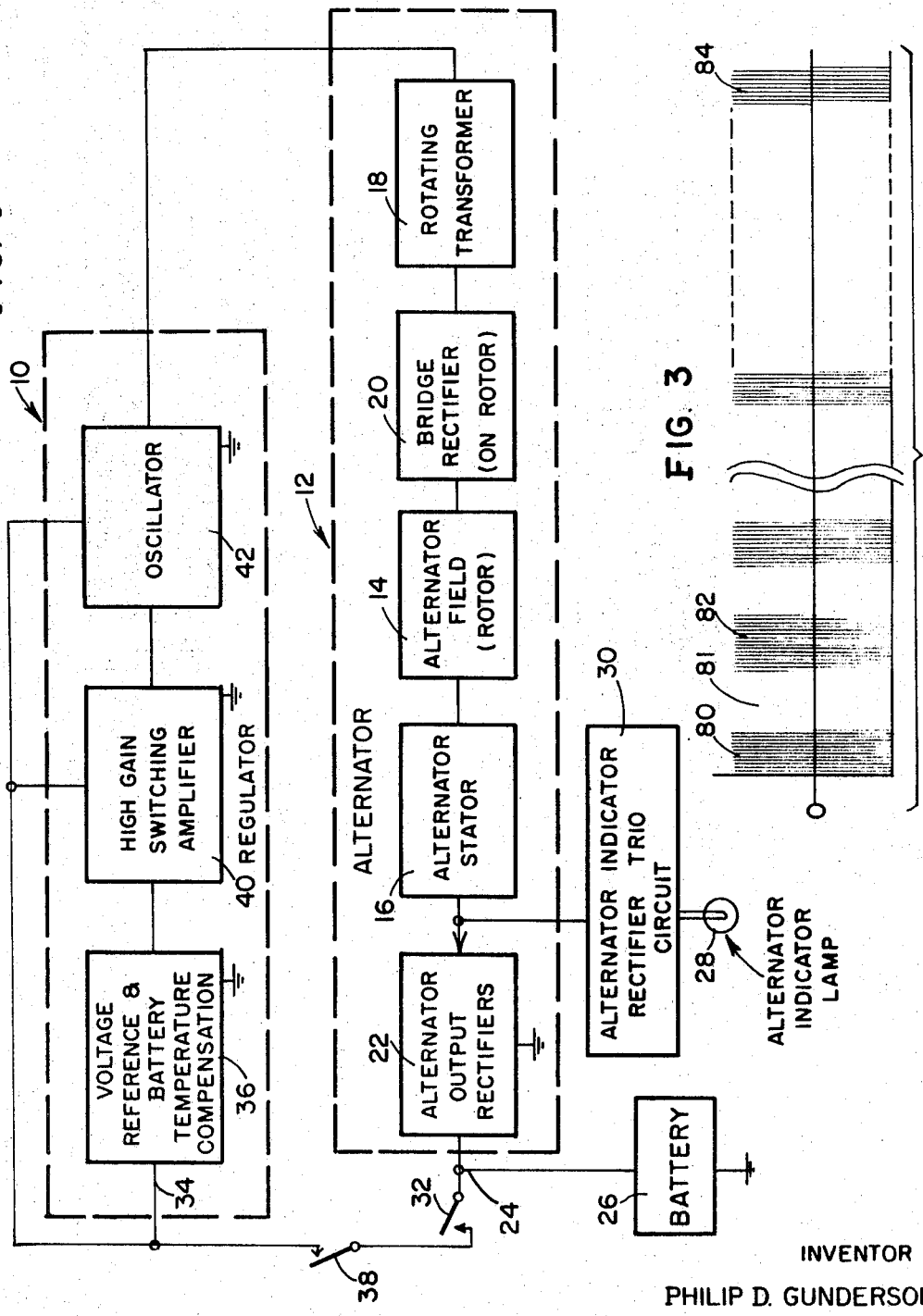

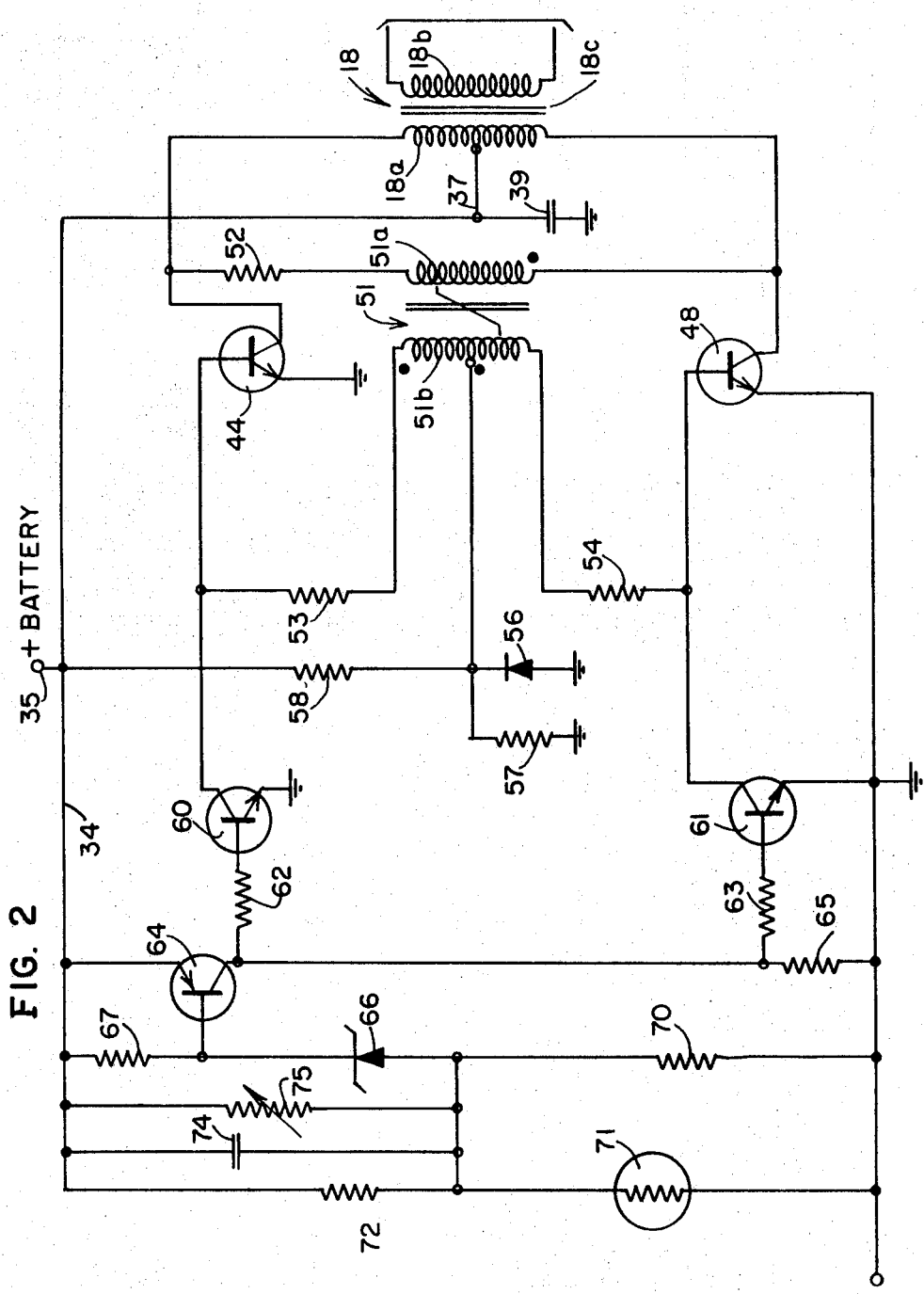

VOLTAGE REGULATOR FOR BRUSHLESS ALTERNATOR

BACKGROUND OF THE INVENTION

This invention relates generally to a voltage regulator and more particularly to a voltage regulator circuit for use in controlling the output of a transformer-type brushless alternator.

Heretofore, dynamoelectric machines, such as alternators for automobiles, generally required the use of slip rings and brushes to apply the necessary DC voltage to the rotor winding thereof to establish the magnetic field for inducing a voltage at the output of such alternators. This arrangement is generally adequate for situations where the motor vehicle using such alternators does not operate for long periods of time, i.e. high mileage automobiles or vehicles. The prior art alternators may operate trouble free for approximately 75,000 miles, more or less. However, when considering this mileage in comparison with trucks or buses or other long haul vehicles, this is of minor consequence. For example, a truck or bus generally operates for 200,000 or 300,000 miles or more in which case it may be necessary to replace the alternator or part thereof two or three times. However, when using new and improved transformer-type brushless alternators which can operate for longer periods of time, it is then desirable to also provide improved voltage regulator means which can operate reliably over the same period of time.

The brushless alternator and regulator system also has specific application to industrial use where it is necessary to operate the alternator system in an explosive atmosphere. The arcing of brushes yields the brush type alternator system useless in this application unless encased in a special costly housing.

SUMMARY OF THE INVENTION

Therefore, it is an object of this invention to provide an improved voltage regulator for use with transformer-type brushless alternators, which have high efficiency and will operate for long periods of time.

A feature of this invention is the use of an oscillator circuit which oscillates continuously at a fixed frequency and which is rendered fully operative or fully inoperative in response to the output voltage of the alternator being controlled thereby.

Briefly, the voltage regulator circuit of the illustrated embodiment of this invention includes a primary winding, which is stationary, of a transformer, which has its secondary winding fastened to and rotatable with the rotor shaft of the alternator. An oscillator is provided which may have a frequency in the order of 20 kHz. or so with a square wave output, or the like. The output of the oscillator is arranged to be transformer coupled into the rotating secondary winding and then rectified through a bridge rectifier circuit mounted directly on the rotor. The rectified signal is then applied to the alternator rotor as an average DC current which induces the necessary magnetic field therein to produce an output in the stator adjacent thereto.

The oscillator circuit of the regulator utilizes a transistor connected in each leg of a push-pull oscillator, i.e. two in number, which are turned on and off alternately. The oscillator is self-starting, but can be held in the off condition by transistors which are controlled by a voltage sensing circuit coupled to the output of the alternator. The oscillator circuit is switched off in such a way as to use the gain of 38 oscillator transistors to increase the total loop gain of the circuit. The oscillator and amplifier on-off hysteresis reflected to the voltage comparison point and the inductance/resistance time constant of the rotor field winding determines the regulator switching frequency, which may be in the order of 100 Hz. The load at the output of the alternator determines the duty cycle of oscillation, a decreased load causing the oscillator to be switched off a substantial portion of the time while a maximum load causes the oscillator to operate continuously. This type of switching arrangement offers relatively high efficiency in that the input power to the regulator, with respect to the power applied to the field winding of the rotor, is on the order of 63 percent. For an 85 amp alternator tested to 75 amps, the voltage regulation for load currents varying between 0 to 75 amperes is better than 1.2 percent.

Power may be supplied to the regulator through an engine oil pressure switch and/or an ignition switch so that the regulator will not draw power from the battery unless the engine is running and thus, the charge in the battery is being maintained by the alternator.

BRIEF DESCRIPTION OF THE DRAWINGS

FIG. 1 is a block diagram illustrating the general overall scheme of the voltage regulator circuit of this invention;

FIG. 2 is a detailed schematic diagram illustrating the preferred embodiment of this invention; and FIG. 3 is a graphical representation of the oscillator output signal being shown as alternately interrupted between fully on and fully off states under low load conditions and a fully on state under a full load condition.

DESCRIPTION OF THE PREFERRED EMBODIMENT

Referring now to Fig. 1, the voltage regulator circuit of this invention is herein illustrated generally by reference numeral 10 to control the output of an alternator designated generally by reference numeral 12. The alternator 12 includes the conventional alternator field rotor 14 which induces a magnetic field into the output stator 16 in the conventional manner. However, in the system used with the illustrated embodiment of this invention, the alternator 12 includes a rotating transformer 18 which has a stationary primary winding for receiving output signals from the regulator 10, and a rotating secondary winding which rotates with the rotor 14. Alternating current voltage induced into the rotating transformer is rectified by a bridge rectifier 20, preferably mounted directly on the rotor for rotation therewith. The bridge rectifier supplies a unidirectional current to the rotor. This current is smoothed by the rotor inductance, thus causing an average magnetic field to be generated therein to develop an output at the stator 16. Additional rectifiers 22 at the output of the alternator are used to produce a DC voltage at a circuit point 24 which supplies the necessary power to the electrical system of a motor vehicle and to charge a battery indicated generally by reference numeral 26. An indicator light 28 is energized through an alternator indicator rectifier trio circuit 30 connected directly to the output of the stator 16 of the alternator 12.

When the ignition switch 32 is actuated to the closed circuit condition, and when the engine is started, closing the oil pressure switch 38, power is applied directly to the voltage regulator through a voltage sensing line 34 to the input of a voltage reference and battery temperature compensation circuit 36. Further, power is applied to a high gain switching amplifier 40 and an oscillator circuit 42. The regulator circuit 10 is employed in a closed loop system as shown by the illustrated embodiment. However, it will be understood that the regulator 10 may be used in an open loop regulator system if desired.

In accordance with the illustrated embodiment of this invention, the output of the oscillator 42 is in the order of about 20 kHz. with the output frequency remaining substantially constant, but with the oscillator operation being interrupted between fully on and fully off conditions for regulating the output power of the alternator 12. That is, the voltage reference and temperature compensating circuit 36 established a reference voltage potential at which the high gain switching amplifier 40 switches to a conductive condition to turn off the oscillator. The oscillator 42 is operated substantially as a free running oscillator to produce at all times an output therefrom until the high gain switching amplifier is rendered conductive which, in turn shunts the oscillator feedback circuit to disable the same.

For a better understanding of the illustrated embodiment disclosed herein, reference is now made to the Figs. 2 and 3.

Here the rotary transformer 18 is shown as including a center tapped primary winding 18a and a rotating secondary winding 18b with a transformer core 18c consisting of two parts, one stationary and one rotating, and a slight airgap therebetween not shown. The arrangement of the rotating transformer is the subject of another copending Pat. application, Ser. No. 34,987, filed May 6, 1970, and assigned to the same assignee. The center tap of primary winding 18a is connected to a voltage source at input terminal 35, which may correspond to the same circuit point 24 of Fig. 1, through a line 37. A filter capacitor 39 is connected between the center tap and ground potential to filter out any high frequency signals which may occur at the input circuit point 35 to prevent extraneous operation of the oscillator circuit and reflect a low impedance for oscillator switching.

One end lead of the primary winding 18a is connected to a transistor 44, having the emitter electrode thereof connected to ground potential. The other end of the primary winding 18a is connected to a transistor 48 which has the emitter electrode thereof connected to ground potential. A feedback transformer 51 includes a primary winding 51a connected directly across the two ends of the primary winding 18a and includes a series current limiting resistor 52. Output signals from the primary winding 18a are also applied to the primary winding 51a which, in turn, transformer couples this signal to a center tap secondary winding 51b thereof which has its ends connected through resistors 53 and 54 to the base electrodes of transistors 44 and 48, respectively. This provides the feedback necessary to sustain oscillation of the circuit at the desired frequency, here it being in the order of 20 kHz. The center tap of the secondary winding 51b is connected to ground potential through a diode 56 which is connected in parallel with a resistor 57 having a relatively low ohmic value, for example, in the order of 5 to 10 ohms. The circuit point between diode 56 and resistor 57 is connected back to the positive potential terminal 35 through a resistor 58 which has a relatively high resistance value, but which is sufficient to bias one or the other of the transistors 44 or 48 to the conductive condition and the transformer action of transformer 51 will cut off the other transistor.

In accordance with one aspect of the illustrated embodiment of this invention, the oscillator is fully operative until such time as the pair of high gain switching transistors 60 and 61 are rendered conductive. These transistors are primarily switching devices which go into conduction rapidly to shunt the base electrodes of transistors 44 and 48 to ground potential thereby disabling the oscillator circuit. The base electrodes of transistors 60 and 61 are coupled through resistors 62 and 63, respectively, to the collector electrode of a voltage sensing transistor 64 which, in turn, is connected in series with a resistor 65. The other electrode of which is connected to ground potential. The base electrode of transistor 64 is connected to the circuit point between the zener diode 66 and a resistor 67 such that voltage regulation is sensed by the relative conductive state of transistor 64 which, in turn, ultimately reaches a condition which causes rapid switching of transistors 60 and 61 to a highly conductive state, as mentioned hereinabove, to disable the oscillator circuit. The voltage applied to the voltage reference circuit is obtained from circuit point 35 which is also the output of the alternator.

The voltage reference circuit further includes a resistor 70 connected to the anode of the zener diode 66 to form a voltage divider therewith. Temperature compensation of the voltage regulator circuit is accomplished by a thermistor 71 connected in parallel with the resistor 70 to sense changes in ambient temperature, i.e. between winter and summer conditions, to automatically adjust the sensing circuit accordingly (fully charged battery voltage is a function of battery temperature). The voltage divider network, including thermistor 71, is further provided with a resistor 72 connected in circuit therewith. A capacitor 74 is connected in parallel with resistors 72 and 73 and an adjustable resistor 75 is connected in parallel with capacitor 74. Adjustable resistor 75 provides means to adjust the level at which the transistor 64 becomes sufficiently conductive to switch transistors 60 and 61 to their highly conductive states, thus disabling the oscillator circuit. For example, if a small load condition exists at the output of the alternator, the oscillator circuit will produce an output as indicated by the waveform portion 80 of Fig. 3 interrupted by the space 81 and repeated again by the waveform portion 82 and so on. This indicates that the oscillator produces a constant output frequency but is alternately switched between fully on and fully off conditions. When the load increases, for example, to an 80 amp condition or so, the output of the oscillator will assume a continuous output condition as indicated by reference numeral 84. Therefore, the strength of the magnetic field developed in the rotor winding will depend upon the average output of the oscillator which, in turn, is controlled by the output requirement of the alternator.

Accordingly, what has been described is a simple regulator circuit for use in conjunction with a brushless alternator which has a rotating transformer connected thereto, and which regulator circuit includes oscillator means as well as means for interrupting the oscillator at intervals corresponding to the load condition sensed at the output of the alternator.

I claim:

1. A voltage regulator for a brushless alternator having a rotor and a stator comprising, in combination:
    a first fixed winding of a rotary transformer, the second winding of which is rotatable by the rotor shaft of the alternator to which a voltage output is to be regulated;
    an oscillator circuit for applying predetermined frequency output signals to said first fixed winding to transformer couple said output signal into the rotatable second winding thereof;
    means for inducing a magnetic field within the alternator stator in response to said output signal being transformer coupled into the rotatable second winding;
    voltage sensing circuit means connected to the output of the alternator to sense the voltage value thereof; and a semiconductor switching means connected between said voltage sensing circuit means and said oscillator circuit to control said oscillator circuit between fully on and fully off conditions at a repetition rate less than said predetermined frequency in accordance with the load requirements sensed at the output of the alternator, thereby producing a substantially constant output voltage at the output of the alternator.

2. The voltage regulator of claim 1 wherein said semiconductor switching means includes a high gain switching transistor which is switched to a highly conductive condition at a desired voltage value to disable the oscillator.

3. The voltage regulator of claim 1 wherein said first fixed winding is a center tapped primary winding, and said second winding is a secondary winding of the rotary transformer.

4. The voltage regulator of claim 3 wherein said oscillator circuit includes first transistor means connected to one end of said primary winding to cause current flow to pass through one-half of said primary winding during one instance and second transistor means connected to the other end of said primary winding to cause current flow to pass through the other half of said primary winding during another instance, each condition of current flow being alternate with one another;
    stationary transformer means including a primary winding connected across said center tapped primary winding of said rotary transformer with secondary windings of said stationary transformer coupled back to said transistor means to provide self-sustained oscillations; and
    high gain switching transistors connected to the input of each of said transistor means to disable said transistor means upon sensing a predetermined output at the alternator.

5. The voltage regulator of claim 4 wherein said high gain switching transistors are rendered conductive simultaneously in response to a voltage sensing transistor.